United States Patent
Mahaney et al.

[11] Patent Number: 5,884,927
[45] Date of Patent: Mar. 23, 1999

[54] 2-WAY BICYCLE DRIVE UNIT

[76] Inventors: Joseph B. Mahaney, 159 W. Mangrum Ct., Pueblo West, Colo. 81007; Bennie E. Farmer, 2012 S. Parkview Dr., Pueblo, Colo. 81006

[21] Appl. No.: 731,568

[22] Filed: Oct. 16, 1996

[51] Int. Cl.⁶ .................................................. B62M 9/04
[52] U.S. Cl. .......................... 280/237; 282/252; 282/261
[58] Field of Search ................................... 280/236, 237, 280/238, 259, 260, 261, 252, 253

[56] References Cited

U.S. PATENT DOCUMENTS

| | | | |
|---|---|---|---|
| 504,168 | 8/1893 | Morris | 280/238 |
| 5,254,042 | 10/1993 | Chung-suk | 280/237 |
| 5,435,583 | 7/1995 | Foster, Jr. | 280/237 |
| 5,533,741 | 7/1996 | Matsuo | 280/238 |
| 5,551,718 | 9/1996 | Toronto et al. | 280/252 |
| 5,662,346 | 9/1997 | Toronto et al. | 280/252 |
| 5,662,347 | 9/1997 | Toronto et al. | 280/252 |

FOREIGN PATENT DOCUMENTS

| | | | |
|---|---|---|---|
| 2065576 | 7/1981 | United Kingdom | 280/252 |
| 2219261 | 12/1989 | United Kingdom | 280/253 |

*Primary Examiner*—Kevin Hurley
*Attorney, Agent, or Firm*—Paul H. Gallagher

[57] ABSTRACT

In a first form, a drive sprocket is driven constantly in a forward direction. It is mounted on a central main shaft. A pair of mutually opposed one-way clutches each have a driving part on the shaft and a driven part on the sprocket, and in pedaling in either of opposite directions, the corresponding clutch becomes active and drives the sprocket in corresponding direction which is the same forward direction. In a second form, there is a direct drive unit, and a reverse drive unit, respectively driving the sprocket in its same forward direction.

11 Claims, 3 Drawing Sheets

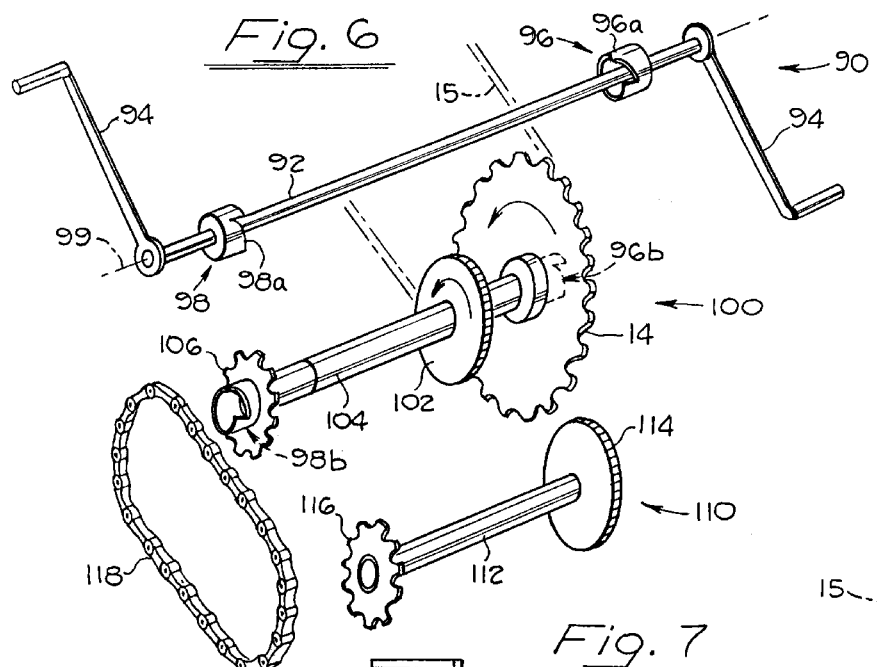
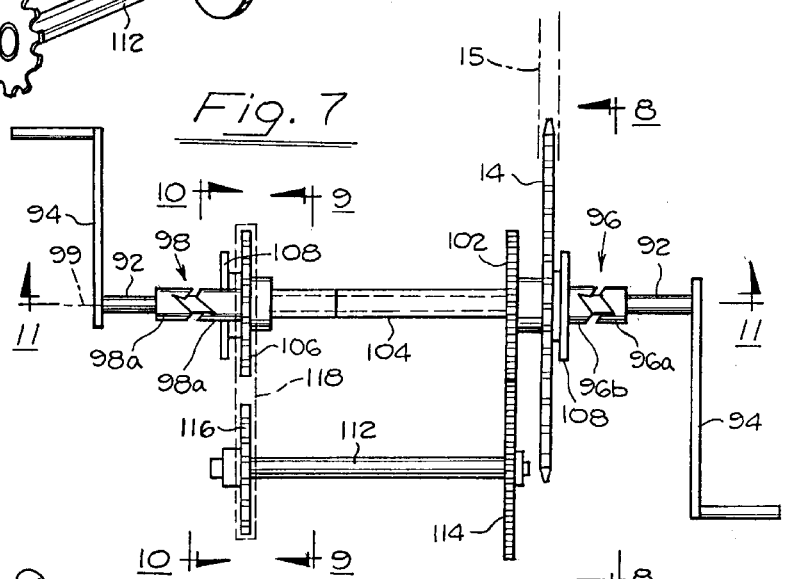
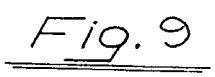
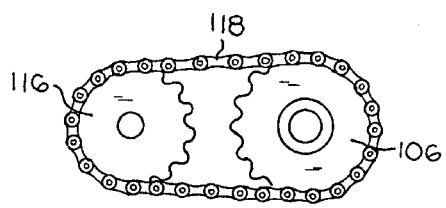
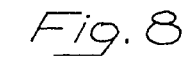
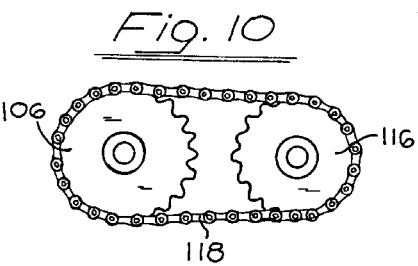
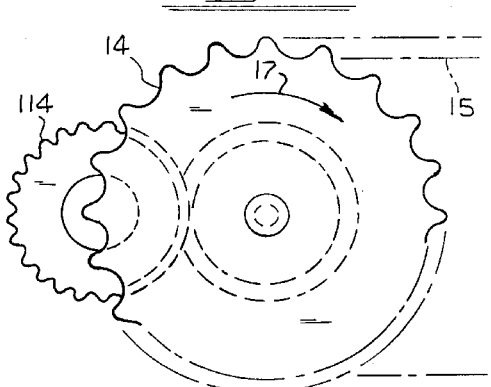

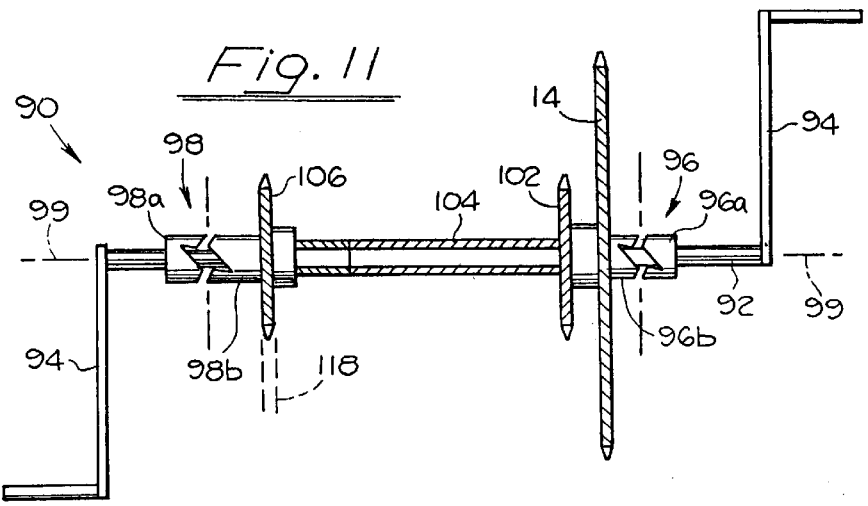
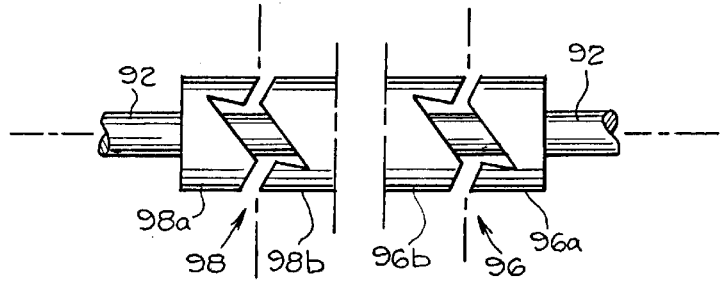
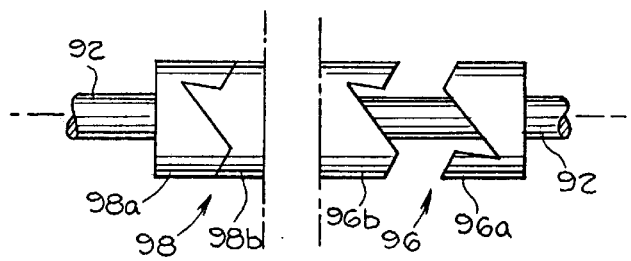
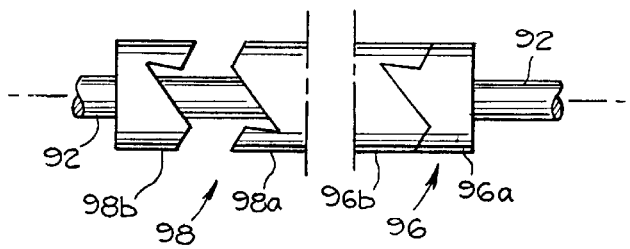
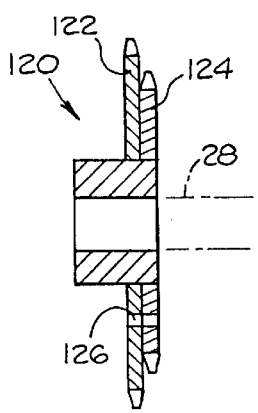
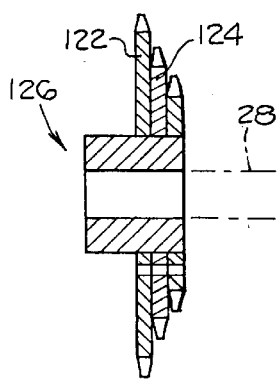

5,884,927

2-WAY BICYCLE DRIVE UNIT

SUMMARY OF THE INVENTION

The device of the invention resides in the field of riding a bicycle for exercise, as distinguished from traveling or transportation. Heretofore, in the ordinary riding of a bicycle, the pedaling is always in the same direction, herein referred to as forwardly. Pedaling in a single direction results in the use and exercise of certain muscles in the legs, but in pedaling in the opposite direction, other muscles are used and exercised, although certain muscles may be used in pedaling in both directions.

An object therefore of the present invention is to provide a new drive unit for bicycles, having the following features and advantages:

1. The unit is effective for driving the bicycle forward whether the pedaling is forward or in reverse.

2. In response to merely changing the direction of pedaling, the drive is transmitted to the bicycle in the intended single forward direction automatically, that is, as a result of the internal law of operation of the unit, as distinguished from requiring a manual shift of elements in the unit.

3. It is of extremely simple construction, and extremely simple in operation, whereby it is necessary only to use the simplest number and kind of elements, and the movement of the elements relative to each other in establishing the directions of motion transmitted to the bicycle.

4. It utilizes a pair of mutually opposed one-way clutches for simplifying the selective interconnection of the elements for establishing the desired direction of drive.

5. It can be substituted for the standard pedaling/drive unit in a bicycle, without requiring any further alteration of the bicycle.

6. It can be made in either of two forms.

BRIEF DESCRIPTION OF THE INDIVIDUAL FIGURES OF THE DRAWINGS

FIG. 6 is an exploded perspective view of the main components making up a second form of the device.

FIG. 7 is a side view of the unit of FIG. 6, showing the components of FIG. 6 in assembled position.

FIG. 8 is a view taken at line 8—8 of FIG. 7.

FIG. 9 is a view taken at line 9—9 of FIG. 7.

FIG. 10 is a view taken at line 10—10 of FIG. 7.

FIG. 11 is a view taken at line 11—11 of FIG. 7.

FIG. 12 is view showing the two clutches in close proximity, with other elements of the device omitted.

FIG. 13 is a view similar to FIG. 12 but showing the first of the clutches engaged and other clutch disengaged.

FIG. 14 is a view similar to FIGS. 12 and 13 showing the second clutch engaged and first clutch disengaged.

FIG. 15 is a sectional view of a multiple speed socket assembly.

FIG. 16 is a sectional view of another multiple speed socket assembly.

DETAILED DESCRIPTION OF THE DRAWINGS

As indicated, the invention is embodied in two different forms; one is shown in FIGS. 1–5, and the other in FIGS. 6–14.

Figure 1:
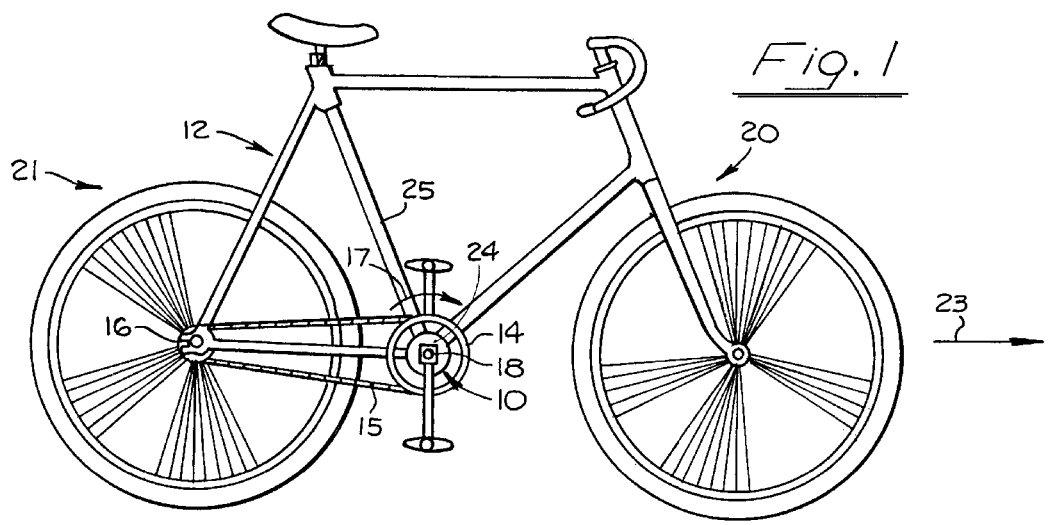
FIG. 1 is a side view of a bicycle with the drive unit of the invention applied to the bicycle.

The drive unit of the first form of the invention is designated in its entirety at 10, in FIG. 1. This figure shows the unit mounted in a bicycle 12, the details of its mounting being described below. For convenience in orienting the unit to the bicycle, attention is directed to the usual main drive sprocket 14 in the bicycle, on which is trained the drive chain 15, the chain also being trained on the sprocket 16 on the rear wheel of the bicycle. The drive sprocket 14, in an ordinary bicycle is driven constantly in forward direction indicated by the arrow 17, which is clockwise as viewed from the right hand side. The forward end of the bicycle is indicated at 20, and the rear end at 21, the direction of movement of the bicycle being indicated by the arrow 23. The drive unit is on a main transverse axis 18 (FIGS. 1 and 2).

Figure 2:
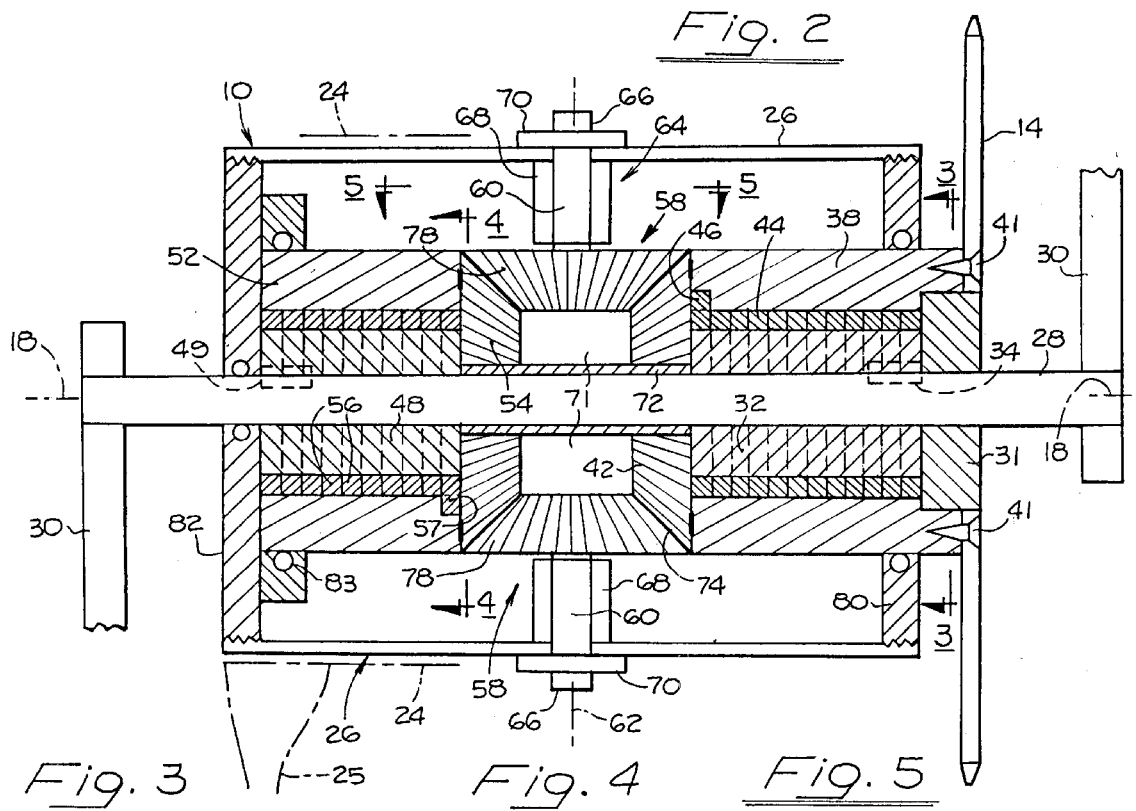
FIG. 2 is an axial sectional view of one form of the drive unit.
Figures 3, 4, 5:
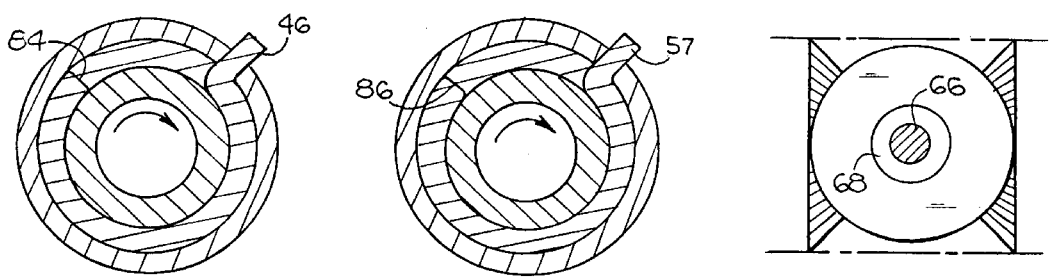
FIG. 3 is a sectional view taken at line 3—3 of FIG. 2.
FIG. 4 is a sectional view taken at line 4—4 of FIG. 2.
FIG. 5 is a radial view taken at line 5—5 of FIG. 2.

The bicycle is provided with the usual tubular housing or bearing member 24 in which the ordinary drive pedal assembly, heretofore known, is mounted, this tubular housing being incorporated in the bicycle frame 25 which is shown in FIG. 2. The drive unit 10 of the present invention is substituted for that assembly, upon removal of the assembly, the tubular housing then serving to support or bear the drive unit 10.

Attention is directed to FIG. 2 which is an axial sectional view taken on the main axis 18 of the unit 10. The unit includes an outer casing or housing 26 which is of cylindrical form and serves as the body or main support of the unit, and is fitted in the tubular housing 24 of the bicycle.

The unit includes a main central shaft 28, on the axis 18, provided with pedals 30 which may be the same, or identical with, the original pedals on the bicycle. This sprocket 14 includes a main central hub 31 and is mounted on the shaft.

The main shaft 28 extends through the body of the unit, and is a single, integral, one-piece shaft. FIG. 2 is oriented according to a viewer at the rear of the bicycle, and the references to the unit as illustrated in this figure correspond with that orientation of the bicycle.

Mounted on the shaft 28 is a right inner hub 32, secured fixedly on the shaft by means of keys 34. Telescoped with the hub 32 is a right outer hub 38 on which the sprocket 14 is secured by means of screws 41, e.g. six in number, for rotation therewith. Alternate forms of hub may be used instead, as shown in FIGS. 15 and 16, as described below. Fixed to the outer hub 38 and loosely mounted on the shaft 28 is a miter gear 42, the connection being shown at 43. The hub 38 and miter gear 42 constitute a first wheel, for cooperation with a second wheel referred to below.

Between the hubs 32 and 38 is a right hand coil spring 44, the turns of which are rectangular in cross section and touching, or substantially so. The axially inner end of this spring has a finger 46 extending radially outwardly into a hole in the outer hub 38.

At the left hand end of the unit 10 (FIG. 2), the elements are identical or similar to the elements of the right hand end, although at least certain ones are symmetrically arranged. At the left hand end is a left inner hub 48 secured to the shaft for rotation therewith by means of a key 49.

Surrounding the left inner hub is a left outer hub 52 similar to the right outer hub except reversely positioned. This left outer hub has an outer cylindrical portion telescoped over the left inner hub, and a miter gear 54 is secured to the hub 52 at 55, and loose on the shaft. The hub 52 and miter gear 54 constitute a second wheel, cooperating with the first wheel identified above.

In this case also, a left coil spring 56 is positioned, which is the same in construction as the right hand coil spring 44 but oppositely arranged. This coil spring includes a finger 57 extending radially into a hole in the outer hub.

The two coil springs 44, 56, function as one-way clutches, or overrunning clutches, which are effective in respectively opposite directions of rotation of the main shaft and pedals.

At the center, axially, are drive transmission units 58 effective for reverse transmission of the drive from the left hand end of the unit to the right hand end, and thus to the sprocket 14. Each of the units 58 includes a pin 60, the two pins lying on a common diametrical axis 62. The pins at the radially outer ends are secured in holders 64, each having a threaded outer stem 66 extending to the exterior of the casing 26, and having an inner end of cup shape 68, receiving the radially outer end of the pin. A lock nut 70 is threaded on the outer end 66, and tightened against the casing. The pins 60 may have enlargements 71 at their inner ends, against which the miter gears 42, 54 bear. If desired, a sleeve bushing 72 may be provided on the main shaft, providing bearing support for the miter gears.

The units 64 may be threadedly adjusted for positioning the pins 60 along the axis 62, and thus other associated elements. Mounted on the pins 60, are tapered pinion gears 78 meshing with the gears 42, 54 forming a differential type transmission unit.

Suitable bearings and closure caps are provided, such as, at the right hand end, a bearing 80 surrounds the main shaft, and provides support for the axially outer ends of the outer and inner hubs. At the left hand end is a plate 82 secured to the outer casing 26, having bearing support on the main shaft, and providing axially outward stop means for holding the left inner and outer hubs in position. Other bearings 83 are provided for radial support of the rotating members at the left hand end.

The assemblies 58 serve to hold the movable units in place in direction axially of the unit. The main shaft is prevented from removal outwardly, to the right, by means of the key 49 at the left end, acting through the left inner hub 48, the miter gear 54, and the assemblies 58, the latter being fixed in the casing. Similarly, the main shaft is prevented from removal or displacement to the left, by means of the key 34 at the right hand end, the latter acting through the right inner hub, the miter gear 74, and the assemblies 58.

In the operation of the unit as thus described, a first direction of rotation of the main shaft is assumed, e.g., in forward direction, which is clockwise as viewed from the right in FIG. 2. Upon rotation of the shaft in this direction, the inner hub 32 is rotated in the same direction through the key 34, and then the rotation is imparted to the right coil spring. This spring is coiled in direction indicated in FIG. 3, which shows the trailing end 84 of the coil spring, i.e. the right hand end in FIG. 2. As the shaft, and the right inner hub, rotate in the direction stated, the coil spring expands outwardly, or enlarges, and forms a bond with the inner surface of the right outer hub 38. Thus there is in effect a solid drive transmission engagement, in radial direction, between the right inner hub and the right outer hub through the coil spring. The action at the left end is identical, but opposite, i.e., when the shaft runs oppositely, the left outer hub causes the left coil spring to expand and form a solid mechanical gripping action between the inner and outer hubs at the left. In each case, i.e., the right or left, the outer hub, while expanding the related spring, relaxes the opposite spring and enables it to contract. In forward direction, the left inner hub 48 and left outer hub 52 are driven, but idling. Thus the two coil springs act as mutually opposed one-way clutches, or overrunning clutches.

Then when the rider wishes to reverse direction of the main shaft, he does so, and the left coil spring, being oppositely arranged, becomes active, in the manner stated. This rotation of the left outer hub is transmitted through the pinion gears 78, and produces a rotating effect in the right outer hub which is opposite that of the left outer hub, it being recalled that the latter is in reverse direction, and thus the right outer hub is in forward direction, namely, the same direction as when it was driven directly by the main shaft.

Accordingly it is seen that through the respective functions of the right and left coil springs 44, 56, the springs become respectively active/inactive, inactive/active, for producing constant forward direction of the right outer hub and thus the sprocket 14 in both directions of rotation of the main shaft.

As will be apparent from the foregoing, there is no requirement for shifting gears, or making any other kind of shifting movement to produce the opposite driving effect, that function being produced automatically upon merely rotating the main shaft in the appropriate direction, the effective being transmitted through the coil springs because of their inherent nature.

Reference is now made to the second form of reverse drive mechanism of the invention, shown in FIGS. 6–14.

Attention is directed to FIG. 6 which shows the parts of this form in exploded position, being so arranged for easy identification. The parts include a unit 90 which includes a main shaft 92, with pedals 94 on the ends. On the shaft are the driving parts 96a, 98a of clutches 96, 98. The shaft rotates on an axis 99. The unit 90 may be considered unitary, which although made up of various elements for convenience in fabrication, it is an effectively integral article.

The clutches 96, 98 are referred to as one-way clutches for convenience, and they are the equivalent of overrunning clutches. The driven parts of these clutches, 96b, 98b, are described below.

Another part 100 includes the drive sprocket 14 identified above, and a gear 102 on a sleeve 104, secured together and as a unit freely rotatable on the shaft 92. The driven clutch part 96b is secured to the sprocket 14 for driving the latter.

The part 100 also includes a secondary sprocket 106 on which is secured the driven clutch part 98b, together as a unit also freely rotatable on the shaft. The secondary sprocket 106 is separate from the drive sprocket 14 and sleeve 104, but may engage the sleeve for axial confinement purposes.

The part 100 is held in position axially by suitable elements of the bicycle frame, indicated diagrammatically at 108 (FIG. 7), and the dimensions and locations of the various elements are such that a position can be assumed as shown in FIG. 12, in which in the case of both clutches 96, 98, the clutch parts are closely adjacent each other, and are moved into drive or interlocking position as referred to hereinbelow.

Another part, 110, includes an idler shaft 112, on which, at one end, the right end herein shown, is mounted a gear 114 meshing with the gear 102. On the other end of the shaft 112 is a sprocket 116 in alignment with the secondary sprocket 106. A secondary drive chain 118 is trained over the sprockets 116, 106. The gear 102, constitutes a first wheel and the sprocket 106 constitutes a second wheel.

Briefly, the gears 102, 114, being intermeshed, rotate in opposite directions constantly, while the sprockets 116, 106, having the chain belt 118 mounted thereon, necessarily rotate in the same direction constantly. The drive through the sprockets and gears is in reverse directions as will be described again hereinbelow.

FIGS. 7 and 12 show the various elements and parts in a neutral or non-driving position and with the clutches both disengaged.

In the pedaling action, a forward direction of pedaling is assumed as the same as in bicycles heretofore, namely in clockwise direction as viewed from the right side of the bicycle, and as indicated by the arrow 17 in FIGS. 1 and 8. In thus pedaling in a forward direction, the parts of the clutch 96 are engaged as shown in FIG. 14, and the parts of the other clutch 98 are disengaged, as shown in the same figure. Thereby, the clutch 96 drives the sprocket 14 and thus the drive chain 16 to the bicycle wheel.

This drive in forward direction, proceeds (FIG. 7) from the right hand end of the shaft 92, through the clutch 96, the sprocket 14 and chain 15 as described.

In this action the gear 102, mounted with the sprocket in a single unit, rotates the gear 114, but in reverse direction, and the gear 114 is secured to an idling shaft 112, as is the sprocket 116, these last three elements rotating in unison as a unit. The gear 114 and sprocket 116 may also be referred to as drive elements. Rotation of the sprocket 116, acting through the chain 118, rotates the sprocket 106, the latter being freely rotatable on the shaft 92 as stated.

In the forward direction just described, the elements, gear 102, gear 114, sprocket 116, chain 118 and sprocket 106 together act as an idling unit, and although the sleeve 104 abuts the hub of the sprocket, these elements rotate in opposite directions. It will be noted at this point, that the parts of the clutch 98 are separated. In this action, the bicycle is driven of course forwardly.

In the second or opposite phase of the pedaling action, the pedals are rotated in what is referred to as a reverse direction, or opposite that described above, counter clockwise as viewed from the right side of the bicycle. In this action the parts of the clutch 98 are engaged (FIG. 13) and drive is transmitted through this clutch. At this step the other clutch 96, is disengaged. Upon rotation of the shaft 92, and acting through the clutch 98 the secondary sprocket 106 is driven in the same direction, or reversely. This sprocket, acting through the chain belt 118, drives the sprocket 116, and the latter, acting through the idling shaft 112, drives the gear 114, and this gear in mesh with the gear 102, drives the latter in direction reverse to that of the pedaling action, but in forward direction for driving the bicycle, in the manner described above.

Thus it will be seen that in either direction of pedaling, the drive sprocket 14 is driven in forward direction.

In the reverse direction of pedaling, different muscles of the rider are brought into play than in pedaling in forward direction, and this feature is a great advantage for exercising the various muscles of the body. The rider of course has the choice of pedaling either forwardly or rearwardly, and in fact still greater exercise is obtained by alternating the direction of pedaling.

FIGS. 15 and 16 show multiple speed sprocket assemblies.

The assembly 120 of FIG. 15 includes two sprockets 122, 124, which may be used in a 5-speed arrangement, having holes 126 for receiving the mounting screws 41 of FIG. 2.

The assembly 126 of FIG. 16 includes three sprockets and may be used in a 10-speed arrangement.

Either of the sprockets may be used instead of the sprocket 14 (FIG. 2) if desired.

As used herein, and particularly in the claims, the expression wheels is to be broadly interpreted as generically covering both sprockets and gears.

The unit embodies an extremely simple construction, rendering it inexpensive to manufacture, and also because of this simplicity, its proper operation is more fully assured.

We claim:

1. A 2-way drive unit for a bicycle having a main frame and a driving wheel, and adapted to run in a forward direction, comprising, a stationary enclosing casing and a reversely rotatable main shaft journaled in the casing and extending through the unit and having pedals on the ends thereof, a first wheel and a second wheel mounted on each end of the shaft for free rotation relative there to, each first wheel being adapted for connection thereto of drive means for driving the bicycle, the drive unit including, at each end, an inner hub and an outer hub, and an overrunning clutch between the inner and outer hubs at each end, oppositely oriented overrunning clutches at the ends of the shaft including a first clutch and a second clutch and each having a driving part operably secured to the shaft, and a driven part operably secured to the respective wheel, the clutches being constituted by coil steerings, reversing drive means operably connected between the wheels, the first clutch being operable, when the parts thereof are connected, for driving the first wheel in a forward direction, and the second clutch being operable when the parts thereof are connected, and when the shaft is rotated oppositely, for acting through the reversing drive means for driving the driving wheel in the same said forward direction.

2. A 2-way drive unit according to claim 1 wherein, the parts of each clutch have driving surfaces interengagable for positively interconnecting the clutch parts, and the parts also having trailing surfaces interengagable for positively disconnecting the clutch parts.

3. A 2-way drive unit according to claim 1 wherein, the reversing drive means includes
      (a) a diametrical pin fixed in the casing, and
      (b) pinion gears on the pin intermeshing with both outer hubs for transmitting drive from the second outer hub to the first outer hub in opposite direction.

4. A 2-way drive unit according to claim 3 wherein, each clutch includes a coil spring interposed between the corresponding inner and outer hubs, each coil spring has one end connected to the corresponding inner hub, and the coil spring expands in radial direction, in response to rotation of the inner hub in forward direction, for establishing friction and driving engagement with the outer hub.

5. A 2-way drive unit according to claim 4 wherein, the turns of the coil springs are rectangular in cross sections, whereby to provide maximum engaging surface of the coil spring.

6. A 2-way drive unit according to claim 1 wherein, one of the outer hubs extends axially to the exterior of the casing, and the drive sprocket is mounted on the exterior end of that outer hub.

7. A 2-way drive unit according to claim 1 wherein, the reversing drive means includes an idling shaft spaced radially from the main shaft, and drive elements at the ends of the idling shaft, one operably connected with the second wheel for rotation in the same direction, and the other operably connected with the first wheel for opposite rotation of the first wheel.

8. A 2-way drive unit according to claim 7 wherein, the first wheel includes a gear, the second wheel includes a sprocket, one of the drive elements of the idling shaft is a sprocket operably aligned with the sprocket of the second wheel, and the unit includes a secondary chain operably interconnecting the two sprockets just stated, and the other of the drive elements of the idling shaft is a gear meshing with the gear of the first wheel.

9. A 2-way drive unit according to claim 8 wherein, the first wheel is a sprocket, and the sprocket is detachably mounted to enable selective incorporation of any of a plurality of sprockets in the unit.

10. A 2-way drive unit according to claim 9 and including, a plurality of such wheels of different kinds, each capable of being operably incorporated in the unit.

11. A 2-way drive unit according to claim 2 wherein, the said first parts of the clutches are fixed on the main shaft both rotationally and axially, the connecting movement of the parts of either clutch causes positive disconnecting movement of the parts of the other clutch, the said second parts of the clutches are fixed axially, and the main shaft, and the said first parts of the clutches thereon, are shiftable axially for enabling connecting and disconnection movements of the clutch parts.

\* \* \* \* \*